June 12, 1962     H. S. SINGER     3,038,402
COOKING DEVICE
Filed March 16, 1959

INVENTOR.
HANS S. SINGER
BY
ATTORNEY

United States Patent Office 3,038,402
Patented June 12, 1962

3,038,402
COOKING DEVICE
Hans S. Singer, 120 Longwood Drive, Spartanburg, S.C.
Filed Mar. 16, 1959, Ser. No. 799,599
1 Claim. (Cl. 99—403)

This invention relates to the culinary arts and more especially to an improved cooking device which operates through novel structure to permit a new way of cooking among other advantages.

Accordingly, an object of this invention is the provision of an improved cover for a cooking dish having an opening therein to permit the placing of an edible carried by a utensil within the dish through the opening while not impairing the effectiveness of the cover.

Another object of the invention is the provision of an improved cover for a cooking dish in which means are provided for positioning a utensil carrying an edible within the dish with a portion of the utensil projecting outwardly of the dish beyond the cover for easy removal.

Another object of this invention is the provision of a cooking dish having an improved cover which has an open central portion and means for positively positioning a utensil carrying an edible so the edible may be easily removed from the opening and at the same time prevent splattering of the contents of the dish while confining heat within the dish.

An important object of this invention is the provision of an improved chafing dish in which an edible may be inserted through an opening in the cover and a plurality of utensils carrying edibles positively positioned along the edge of the dish.

Another object of the invention is the provision of a cooking dish having an open cover for easy access to the dish being provided with a plurality of spaced shields to protect the user by preventing splattering of the contents of the dish.

Another object of the invention is the provision of a new way to prepare food in which a number of persons may cook a relatively small portion of an edible at a time in such a manner that all may conveniently use a common cooking dish.

The construction designed to carry out the invention will be hereinafter described, together with other features thereof.

Figure 1:
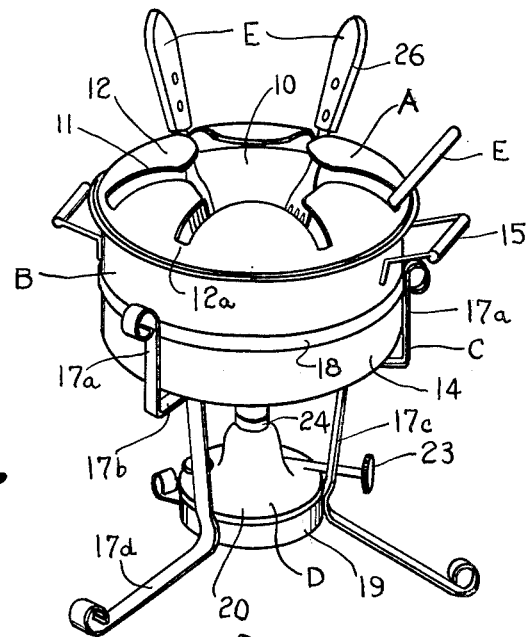
Figure 2:
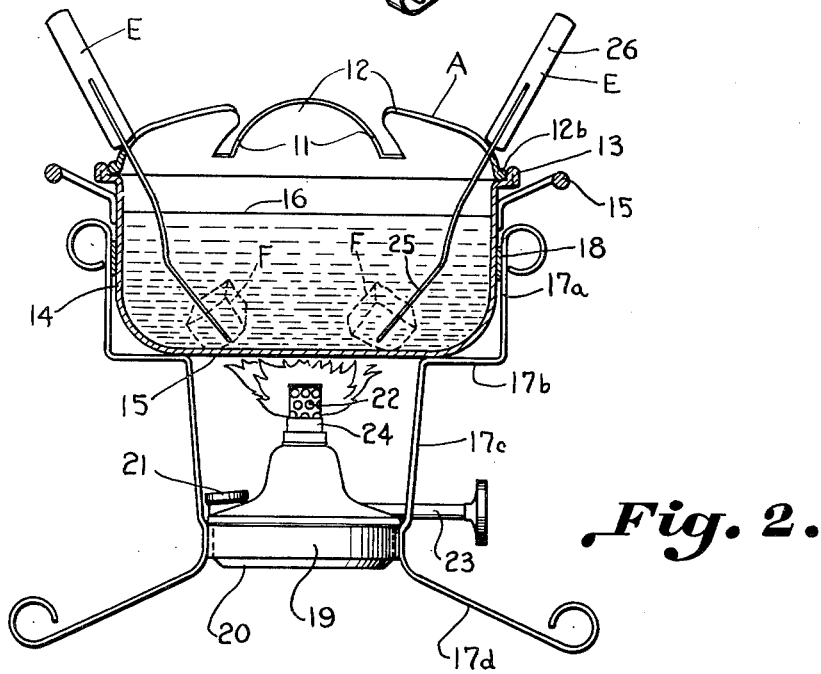

The invention will be more readily understood from a reading of the following specification and by reference to the accompanying drawing forming a part thereof, wherein an example of the invention is shown and wherein:

FIGURE 1 is a perspective view illustrating a cooking device constructed in accordance with the present invention, and FIGURE 2 is an enlarged transverse sectional view of the device shown in FIGURE 1.

Referring more particularly to the drawing a cover A having an open central portion 10 is provided with a plurality of spaced slots 11 extending therefrom toward the marginal portion of the cover in order to provide a plurality of spaced shields 12. The cover A is carried by a cooking dish B which is shown positioned in a suitable support C. The support C positions suitable heating means D beneath the dish B. In operation a utensil E is used to carry an edible F on one end so that the edible may be inserted through the opening 10 and so that a portion of the utensil projects from the dish for easy removal of the utensil carrying the edible.

The cover A may be constructed of any suitable material and preferably is of a dome shape. The slots 11 should extend a substantial distance toward the marginal portion of the cover so as to leave connecting portions 12a so that the shields 12 may be joined together. It will be noted that a bead 12b is formed in the edge of the cover to be received by the flange 13 of the dish B. The dish B is provided with a circular side 14 and a flat bottom 15.

The cover A and the dish B are preferably circular in cross-section so that persons gathered around the dish may make convenient use thereof. The side wall 14 of the dish B should be of sufficient depth to hold a cooking medium such as a suitable cooking oil 16 at sufficient depth as one would use to carry out the operation of deep fat frying. The dish B is shown provided with an insulated handle 15.

The support C consists essentially of a suitable number of spaced substantially vertical members 17 which are suitably formed to serve as a support for the dish B and the heating element D. The upper portion of the vertical members 17a serve to confine the cooking dish upon horizontal portions 17b which serve as a seat for the bottom 15 of the dish. An annular bracing member 18 is joined to members 17a to confine the dish B within the support. An intermediate portion 17c joins the horizontal portions 17b with leg portions 17d.

The heating means D are shown supported at the juncture of the intermediate portion 17c and the leg portions 17d. An annular bracing member 19 which is suitably joined to the vertical members 17 serves as a support for the heating means D which is shown in the form of an alcohol heater. It should be noted that any type heating means may be employed; however, one which provides ready adjustment for the heat output is preferred. The container 20 is supplied with alcohol by removing the cover 21. Fuel is supplied to the wick 22 which may be adjusted by turning the knob 23 to raise and lower the wick 22 within the shield 24. If desired, a shield (not shown) may be added to prevent the flame produced by the wick from being extinguished by wind if used out-of-doors or on a porch.

In operation, an edible F is placed on a utensil, in this case a fork having tines 25 at its lower end and a suitably insulated handle 26 at the end projecting from the dish. The cooking medium should be near the boiling point so that meat, for example, may be seared rapidly to seal in the flavor and juices. Any suitable edible may be used but steak is preferred. The steak may be cut into small pieces about three quarters of an inch square and individual pieces cooked by a number of individuals who place their own fork carrying a small piece of steak, which has already been seasoned, in the dish and supporting the fork within a slot in the cover. The cover prevents the splashing of hot grease on the users while confining the heat within the dish. After removing the steak from the dish after cooking a short time, about a minute, the steak may be removed from the fork and another small piece placed into the dish for cooking while the cooked piece is eaten. This makes the device very versatile and suitable for party or everyday use.

While a preferred embodiment of the invention has been described using specific terms, such description is for illustrative purposes only, and it is to be understood that changes and variations may be made without departing from the spirit or scope of the following claim.

I claim as my invention:

A cooking apparatus comprised of a chafing dish for deep fat frying, an annular flange extending about the periphery of the top of said dish, a removable substantially dome-shaped cover for said dish, said cover having a centrally located opening therein, an edge defining the periphery of said cover and in mating relationship with said flange, a spacing border extending from said edge, a plurality of circumferentially spaced inwardly projecting shields extending from said border and defining said opening, and the space between said shields defining a plurality of utensil receiving slots extending radially outwardly from said opening toward said edge, each of said slots of a dimension to receive a utensil having means for carrying an edible at a first end and having an insulated handle at its other end, such that said first end can be inserted into said dish and removed therefrom through said opening, and said utensil is supported in a substantially upright position within one of said slots with said handle projecting outwardly of the cover during that period when said edible is in said dish.

References Cited in the file of this patent

UNITED STATES PATENTS

| | | |
|---|---|---|
| 725,335 | Glaessner | Apr. 14, 1903 |
| 1,539,153 | Bennett | May 26, 1925 |
| 1,706,491 | Jenkins | Mar. 26, 1929 |
| 1,809,510 | Churchill | June 9, 1931 |